United States Patent
Xu et al.

(10) Patent No.: US 12,278,759 B2
(45) Date of Patent: Apr. 15, 2025

(54) COMMUNICATION METHOD AND APPARATUS

(71) Applicant: HUAWEI TECHNOLOGIES CO., LTD., Guangdong (CN)

(72) Inventors: Bin Xu, Beijing (CN); Bingzhao Li, Beijing (CN); Yan Wang, Beijing (CN); Lei Chen, Beijing (CN); Hong Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 355 days.

(21) Appl. No.: 17/837,602

(22) Filed: Jun. 10, 2022

(65) Prior Publication Data

US 2022/0303214 A1   Sep. 22, 2022

Related U.S. Application Data

(63) Continuation of application No. PCT/CN2019/124514, filed on Dec. 11, 2019.

(51) Int. Cl.
*H04L 45/17* (2022.01)
*H04L 45/74* (2022.01)
*H04L 47/34* (2022.01)
*H04W 36/02* (2009.01)

(52) U.S. Cl.
CPC .............. *H04L 45/74* (2013.01); *H04L 47/34* (2013.01); *H04W 36/0235* (2023.05)

(58) Field of Classification Search
CPC .... H04L 45/74; H04L 47/34; H04W 36/0235; H04W 40/20; H04W 36/0007
USPC ......................................... 370/351, 389, 392
See application file for complete search history.

(56) References Cited

U.S. PATENT DOCUMENTS

| | | |
|---|---|---|
| 2012/0294276 A1 | 11/2012 | Jaiswal et al. |
| 2017/0289021 A1 | 10/2017 | Ily et al. |
| 2019/0274058 A1* | 9/2019 | Liu ............ H04W 28/04 |
| 2022/0239589 A1* | 7/2022 | Uberoy ........... H04L 45/24 |

FOREIGN PATENT DOCUMENTS

| | | |
|---|---|---|
| CN | 101272607 A | 9/2008 |
| CN | 107078968 A | 8/2017 |
| CN | 109729506 A | 5/2019 |
| CN | 105009638 B | 10/2019 |

OTHER PUBLICATIONS

Extended European Search Report in European Appln No. 19956050.9, dated Nov. 2, 2022, 10 pages.

(Continued)

*Primary Examiner* — Obaidul Huq
(74) *Attorney, Agent, or Firm* — Fish & Richardson P.C.

(57) ABSTRACT

The disclosure provides communication methods and apparatuses. One example method includes that at least one data packet of a first service is received, where the at least one data packet includes a first data packet, and the first data packet is located at a first location in the at least one data (Continued)

packet. Then, the at least one data packet and first indication information are sent to a first network device, where the first indication information indicates the first location.

17 Claims, 4 Drawing Sheets

(56) References Cited

OTHER PUBLICATIONS

3GPP TS 38.413 V15.5.0, "3rd Generation Partnership Project; Technical Specification Group Radio Access Network; NG-RAN; NG Application Protocol (NGAP) (Release 15)," Sep. 2019, 329 pages.
3GPP TS 38.423 V15.5.0, "3rd Generation Partnership Project; Technical Specification Group Radio Access Network; NG-RAN; Xn application protocol (XnAP) (Release 15)," Sep. 2019, 311 pages.
3GPP TS 29.281 V15.6.0, "3rd Generation Partnership Project; Technical Specification Group Core Network and Terminals; General Packet Radio System (GPRS) Tunnelling Protocol User Plane (GTPv1-U) (Release 15)," Sep. 2019, 32 pages.
3GPP TS 33.401 V16.0.0, "3rd Generation Partnership Project; Technical Specification Group Services and System Aspects; 3GPP System Architecture Evolution (SAE); Security architecture(Release 16)," Sep. 2019, 163 pages.
3GPP TS 38.300 V15.7.0, "3rd Generation Partnership Project; Technical Specification Group Radio Access Network; NR; NR and NG-RAN Overall Description; Stage 2 (Release 15)," Sep. 2019, 99 pages.
3GPP TS 38.415 V15.2.0, "3rd Generation Partnership Project; Technical Specification Group Radio Access Network; NG-RAN; PDU Session User Plane Protocol (Release 15)," Dec. 2018, 12 pages.
Ford et al., "TCP Extensions for Multipath Operation with Multiple Addresses," Internet Engineering Task Force (IETF), Request for Comments: 6824, Jan. 2013, 64 pages.
PCT International Search Report and Written Opinion issued in International Application No. PCT/CN2019/124514 on Sep. 2, 2020, 17 pages (with English translation).

* cited by examiner

COMMUNICATION METHOD AND APPARATUS

CROSS-REFERENCE TO RELATED APPLICATIONS

This application is a continuation of International Application No. PCT/CN2019/124514, filed on Dec. 11, 2019, the disclosure of which is hereby incorporated by reference in its entirety.

TECHNICAL FIELD

This application relates to communication technologies, and in particular, to a communication method and apparatus.

BACKGROUND

Currently, a wireless communication system has been widely applied to people's daily life. Specifically, the wireless communication system may provide various services such as a telephone service, a voice service, a video service, a data service, and a reception and sending service for a user, so that the user can handle various affairs in daily life, work, and study, without leaving a house. This greatly improves user transaction processing convenience and user experience.

The wireless communication system includes at least one core network device and at least one base station. A terminal device of the user may access the base station to connect to the wireless communication system, so that the user processes a service by using the terminal device and the wireless communication system. For example, related processing of the service in the wireless communication system may include: When the terminal device of the user processes a service, the core network device sends a data packet of the service to the base station, and the base station sends the received data packet of the service to the terminal device of the user, so that the terminal device of the user processes the service based on the data packet of the service. In a scenario in which the wireless communication system includes a plurality of base stations, because a base station connected to the terminal device of the user needs to be changed from a source base station to a target base station when a user location or communication quality changes, after the change, the target base station needs to continue to process a service related to the terminal device.

However, in a running process of the wireless communication system, because the base station cannot detect progress information of a service supported by the base station, the base station cannot accurately perform processing related to the service supported by the base station. Consequently, a service cannot be provided for a user well, and user experience is affected.

SUMMARY

This application provides a communication method and apparatus, to resolve the following problem: Because a base station cannot detect progress information of a service supported by the base station, the base station cannot accurately perform processing related to the service supported by the base station. Consequently, a service cannot be provided for a user well, and user experience is affected.

According to a first aspect, this application provides a communication method, including:
receiving at least one data packet of a first service, where the at least one data packet includes a first data packet, and the first data packet is located at a first location in the at least one data packet; and sending the at least one data packet and first indication information to a first network device, where the first indication information indicates the first location.

The first network device may be a source network device or a target network device.

The first indication information is sent to the first network device, where the first indication information indicates the first location of the first data packet in the first service, so that the first network device may determine progress information of the currently processed first service based on the first location indicated by the first indication information. Therefore, the first network device more accurately and effectively performs processing related to the first service, based on the progress information of the first service. In this way, a service is better provided for a user, and user experience is improved.

In a possible implementation, the first indication information includes a sequence number of the first data packet, and the sequence number of the first data packet indicates the first location of the first data packet in the at least one data packet.

In a possible implementation, a general packet radio service tunneling protocol-user plane sequence number of the first data packet is determined based on the first location of the first data packet in the at least one data packet.

In a possible implementation, the first indication information includes a first offset and a sequence number of the first data packet, and the first offset is a difference between the sequence number of the first data packet and a sequence number corresponding to the first location.

In a possible implementation, the sequence number of the first data packet is a general packet radio service tunneling protocol-user plane sequence number of the first data packet.

In a possible implementation, the first indication information is included in a packet header, a payload, or data of the first data packet; or the first indication information is included in a packet header, a payload, or data of a preset data packet.

In a possible implementation, the sending first indication information to a first network device includes:
sending the first indication information to the first network device at a first moment, where the first moment is one of a plurality of periodically configured moments, and duration between two adjacent moments in the plurality of moments is specified duration; or
sending the first indication information to the first network device after sending N data packets to the first network device, where N≥0, and N is an integer.

According to a second aspect, this application provides a communication method, including: receiving at least one data packet of a first service and first indication information from a core network device, where the first indication information indicates a first location of a first data packet in the at least one data packet, and the at least one data packet includes the first data packet.

The first indication information sent by the core network device is received, where the first indication information indicates the first location of the first data packet in the first service, so that a first network device may determine progress information of the currently processed first service based on the first location indicated by the first indication information. Therefore, the first network device more accurately and effectively performs processing related to the first service, based on the progress information of the first service. In this way, a service is better provided for a user, and user experience is improved.

In a possible implementation, the first indication information includes a sequence number of the first data packet, and the sequence number of the first data packet indicates the first location of the first data packet in the at least one data packet.

In a possible implementation, the first indication information includes a first offset and a sequence number of the first data packet, and the first offset is a difference between the sequence number of the first data packet and a sequence number corresponding to the first location.

In a possible implementation, the sequence number of the first data packet is a general packet radio service tunneling protocol-user plane sequence number of the first data packet.

In a possible implementation, the first indication information is included in a packet header, a payload, or data of the first data packet; or the first indication information is included in a packet header, a payload, or data of a preset data packet.

In a possible implementation, after the receiving at least one data packet and first indication information from a core network device, the method further includes: sending second indication information to a second network device, where the second indication information indicates a second sequence number, and the second sequence number is a maximum sequence number of a data packet that is of the first service and that is received by a first network device from the core network device; and/or receiving third indication information sent by the second network device, where the third indication information indicates a third sequence number, and the third sequence number is a maximum sequence number of a data packet that is of the first service and that is received by the second network device from the core network device.

The second indication information is sent to the second network device, so that the second network device may determine, based on the maximum sequence number, represented by the second indication information, of the data packet that is of the first service and that is received by the first network device from the core network device, current progress of the first service supported by the first network device. Therefore, the second network device more accurately and effectively performs processing related to the first service supported by the first network device, based on the current progress of the first service supported by the first network device.

The third indication information sent by the second network device is received, so that the first network device may determine, based on the maximum sequence number, represented by the third indication information, of the data packet that is of the first service and that is received by the second network device from the core network device, current progress of the first service supported by the second network device. Therefore, the first network device more accurately and effectively performs processing related to the first service supported by the second network device, based on the current progress of the first service supported by the second network device.

In a possible implementation, the first network device is a source network device, the second network device is a target network device, the second indication information further indicates information about the first service, and the information about the first service includes at least one of the following:

identification information of the first service; a type of the first service; packet data unit session identification information of the first service; a packet data unit session type of the first service; and data radio bearer identification information of the first service; and the third indication information further indicates whether the second network device supports the first service.

In a possible implementation, the second sequence number corresponds to the first service; and/or the third sequence number corresponds to the first service.

In a possible implementation, after the receiving third indication information sent by the second network device, the method further includes: determining a third data packet based on the third indication information; and sending the third data packet to the second network device.

In a possible implementation, when the first network device is a target network device, and the second network device is a source network device, and after the sending second indication information to a second network device, the method further includes: determining a fourth data packet based on the third indication information; and buffering the fourth data packet.

According to a third aspect, this application provides a communication apparatus, including: a first receiving module, configured to receive at least one data packet of a first service, where the at least one data packet includes a first data packet, and the first data packet is located at a first location in the at least one data packet; and a sending module, configured to send the at least one data packet and first indication information to a first network device, where the first indication information indicates the first location.

In a possible implementation, the first indication information includes a sequence number of the first data packet, and the sequence number of the first data packet indicates the first location of the first data packet in the at least one data packet.

In a possible implementation, the sending module is further configured to determine a general packet radio service tunneling protocol-user plane sequence number of the first data packet based on the first location of the first data packet in the at least one data packet.

In a possible implementation, the first indication information includes a first offset and a sequence number of the first data packet, and the first offset is a difference between the sequence number of the first data packet and a sequence number corresponding to the first location.

In a possible implementation, the sequence number of the first data packet is a general packet radio service tunneling protocol-user plane sequence number of the first data packet.

In a possible implementation, the first indication information is included in a packet header, a payload, or data of the first data packet; or the first indication information is included in a packet header, a payload, or data of a preset data packet.

In a possible implementation, the sending module includes a sending unit configured to send the first indication information to the first network device. The sending unit is specifically configured to send the first indication information to the first network device at a first moment, where the first moment is one of a plurality of periodically configured moments, and duration between two adjacent moments in the plurality of moments is specified duration; or the sending unit is specifically configured to send the first indication information to the first network device after sending N data packets to the first network device, where N≥0, and N is an integer.

According to a fourth aspect, this application provides a communication apparatus, including: a second receiving module, configured to receive at least one data packet of a first service and first indication information from a core network device, where the first indication information indicates a first location of a first data packet in the at least one data packet, and the at least one data packet includes the first data packet.

In a possible implementation, the first indication information includes a sequence number of the first data packet, and the sequence number of the first data packet indicates the first location of the first data packet in the at least one data packet.

In a possible implementation, the first indication information includes a first offset and a sequence number of the first data packet, and the first offset is a difference between the sequence number of the first data packet and a sequence number corresponding to the first location.

In a possible implementation, the sequence number of the first data packet is a general packet radio service tunneling protocol-user plane sequence number of the first data packet.

In a possible implementation, the first indication information is included in a packet header, a payload, or data of the first data packet; or the first indication information is included in a packet header, a payload, or data of a preset data packet.

In a possible implementation, the second receiving module is further configured to: after receiving the at least one data packet and the first indication information from the core network device, send second indication information to a second network device, where the second indication information indicates a second sequence number, and the second sequence number is a maximum sequence number of a data packet that is of the first service and that is received by a first network device from the core network device; and/or the second receiving module is further configured to: after receiving the at least one data packet and the first indication information from the core network device, receive third indication information sent by the second network device, where the third indication information indicates a third sequence number, and the third sequence number is a maximum sequence number of a data packet that is of the first service and that is received by the second network device from the core network device.

In a possible implementation, the first network device is a source network device, the second network device is a target network device, the second indication information further indicates information about the first service, and the information about the first service includes at least one of the following:
- identification information of the first service; a type of the first service; packet data unit session identification information of the first service; a packet data unit session type of the first service; and data radio bearer identification information of the first service; and the third indication information further indicates whether the second network device supports the first service.

In a possible implementation, the second sequence number corresponds to the first service; and/or the third sequence number corresponds to the first service.

In a possible implementation, the second receiving module is further configured to: after receiving the third indication information sent by the second network device, determine a third data packet based on the third indication information, and send the third data packet to the second network device.

In a possible implementation, the first network device is a target network device, the second network device is a source network device, and the second receiving module is further configured to: after sending the second indication information to the second network device, determine a fourth data packet based on the third indication information, and buffer the fourth data packet.

According to a fifth aspect, this application provides a communication system, including at least one core network device and at least one first network device, where the core network device includes the apparatus according to the third aspect, and the first network device includes the apparatus according to the fourth aspect. Alternatively, the communication system includes at least one first network device and at least one terminal device, where the first network device includes the apparatus according to the fourth aspect.

According to a sixth aspect, this application provides a computer-readable storage medium, including a computer program. When the computer program is executed on a computer, the computer is enabled to perform the method according to any one of the first aspect and the second aspect.

According to a seventh aspect, this application provides a computer program. When the computer program is executed by a computer, the computer is enabled to perform the method according to any one of the first aspect and the second aspect.

According to an eighth aspect, this application provides a chip, including a processor and a memory. The memory is configured to store a computer program, and the processor is configured to invoke and run the computer program stored in the memory, to perform the method according to any one of the first aspect and the second aspect.

According to a ninth aspect, this application provides a communication device, including: a processor; a memory, configured to store a calculator program and/or data; a transceiver, configured to receive and transmit information. The processor is configured to invoke the computer program and/or data stored in the memory, so that the communication device implements the method according to any one of the first aspect and the second aspect.

DESCRIPTION OF EMBODIMENTS

To make the objectives, technical solutions, and advantages of this application clearer, the following clearly and completely describes the technical solutions in this application with reference to the accompanying drawings in this application. Obviously, the described embodiments are a part rather than all of embodiments of this application. All other embodiments obtained by a person of ordinary skill in the art based on embodiments of this application without creative efforts shall fall within the protection scope of this application.

In the specification, embodiments, claims, and accompanying drawings of this application, the terms "first", "second", and the like are merely intended for distinguishing and description, and shall not be understood as an indication or implication of relative importance or an indication or implication of an order. In addition, the terms "include", "have", and any variant thereof are intended to cover non-exclusive inclusion, for example, including a series of steps or units. A method, system, product, or device is not necessarily limited to those steps or units that are expressly listed, but may include other steps or units that are not expressly listed or inherent to such a process, method, product, or device.

It should be understood that, in this application, "at least one" means one or more, and "a plurality of" means two or more. The term "and/or" is used to describe an association relationship between associated objects and represents that three relationships may exist. For example, "A and/or B" may represent the following three cases: Only A exists, only B exists, and both A and B exist, where A and B may be singular or plural. The character "/" generally indicates an "or" relationship between the associated objects. "At least one of the following items (pieces)" or a similar expression thereof means any combination of these items, including a single item (piece) or any combination of a plurality of items (pieces). For example, at least one (piece) of a, b, or c may represent a, b, c, "a and b", "a and c", "b and c", or "a, b, and c", where a, b, and c may be singular or plural.

Figure 1:
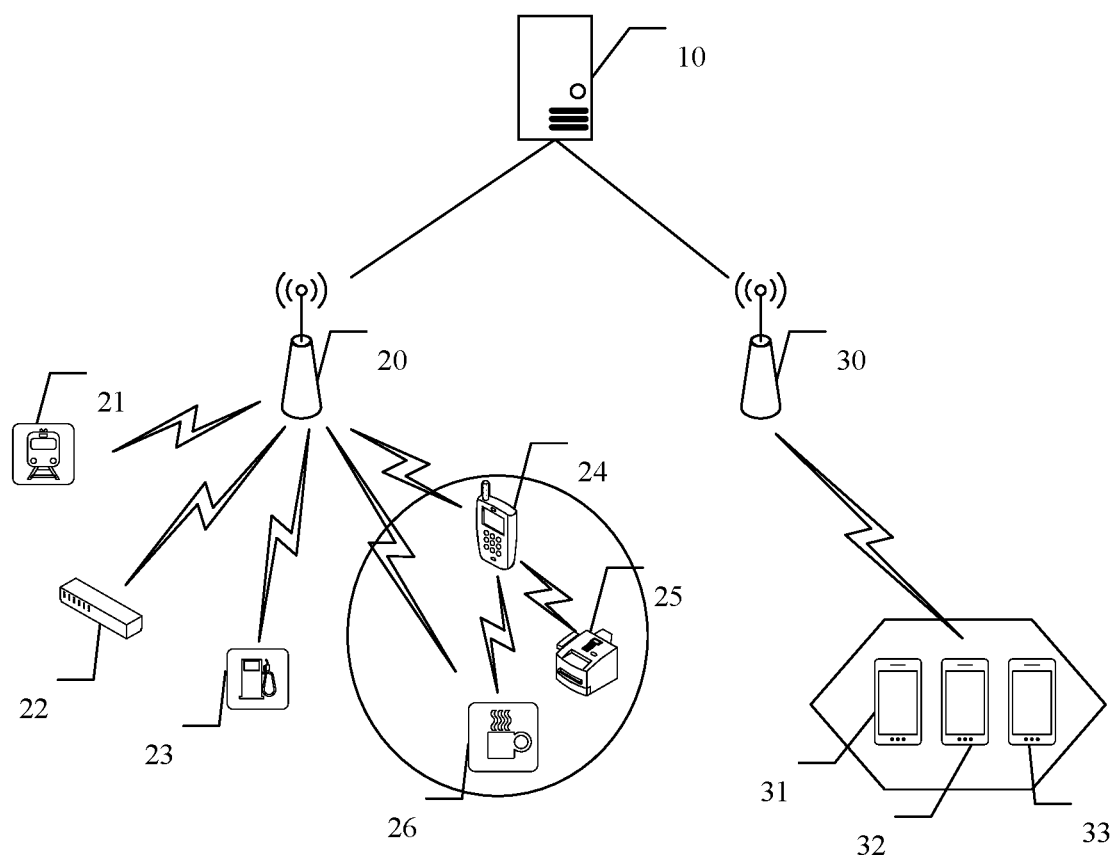
FIG. 1 is a schematic diagram of an application scenario of a communication method according to this application.

FIG. 1 is a schematic diagram of an application scenario of a communication method according to this application. It can be learned from FIG. 1 that the application scenario includes a core network device 10, network devices 20 and 30, and terminal devices 21 to 26, and 31 to 33. The terminal devices 21 to 26 are connected to the network device 20, and the terminal devices 31 to 33 are connected to the network device 30.

In addition, the terminal devices 24-26 may form a communication system. Based on this, the network device 20 may send downlink data to the terminal devices 21 to 23 and the terminal device 24, and the terminal device 24 may send the downlink data to the terminal devices 25 and 26.

The terminal devices 31 to 33 may send uplink data to the network device 30, and the network device 30 may send downlink data to the terminal devices 31 to 33.

The core network device 10 receives a data packet that is of a service and that is sent by a data server or a data network of the service. Specifically, for a plurality of services, links or session connections (represented by links in the following description) between the core network device 10 and data servers or data networks of various services are first respectively established. Then, a data server or a data network of each service sends a data packet to the core network device 10 through a corresponding link. The core network device 10 receives the data packet of the corresponding service through the corresponding link.

The core network device 10 sends the data packet of the service to a network device. Specifically, for at least one service and one network device, a link is first established between the core network device 10 and the network device for each of the at least one service, and then the core network device 10 sends a data packet of a corresponding service to the network device through the link for the service. It should be noted that, because the data packet of the at least one service is sent to each network device by the core network device 10 on a same principle, a case of the at least one service and a plurality of network devices is not described herein again.

As shown in FIG. 1, if a data packet of a service is sent to the network devices 20 and 30, a first link of the service needs to be established between the core network device 10 and the network device 20, and a second link of the service needs to be established between the core network device 10 and the network device 30. Then, the core network device 10 sends the data packet of the service to the network device 20 through the first link, and sends the data packet of the service to the network device 30 through the second link. If both a data packet of a first service and a data packet of a second service are sent to the network device 20, a link of the first service is established between the core network device 10 and the network device 20, and a link of the second service is established between the core network device 10 and the network device 20. Then, the core network device 10 sends the data packet of the first service to the network device 20 through the link of the first service, and sends the data packet of the second service to the network device 20 through the link of the second service. If the data packet of the first service is sent to the network device 20, and the data packet of the second service is sent to the network device 30, the link of the first service is established between the core network device 10 and the network device 20, and the link of the second service is established between the core network device 10 and the network device 30. Then, the core network device 10 sends the data packet of the first service to the network device 20 through the link of the first service, and sends the data packet of the second service to the network device 30 through the link of the second service.

The network device may send downlink data to a terminal device, where the downlink data includes the data packet of the service. The network device may send the downlink data to the terminal device in two manners. In a first manner, the network device may send the downlink data to the terminal device in a unicast manner. In a second manner, the network device may send the downlink data to the terminal device in a multicast (or multicast) manner.

Specifically, if the downlink data is sent to the terminal device in the unicast manner, when the network device sends a data packet of a service to a plurality of terminal devices, a dedicated bearer or a dedicated connection needs to be established for each terminal device and the network device based on the service. Therefore, each terminal device receives the data packet of the service from the network device by using a dedicated bearer corresponding to the terminal device. If the network device sends data packets of a plurality of services to a same terminal device, one or more dedicated bearers between the terminal device and the network device may need to be established based on each service.

If the downlink data is sent to the terminal device in the multicast manner, when the network device sends a data packet (that is, downlink data) of a service to at least one terminal device, a dedicated bearer or connection does not need to be established for each terminal device. The at least one terminal device may receive the data packet of the service from the network device by using a unified bearer or configuration information.

As shown in FIG. 1, the network device 20 may send the downlink data to the terminal devices 21 to 23 in the unicast manner, and the network device 20 may send the downlink data to the terminal device 24 and the terminal device 26 in the unicast manner. The terminal device 24 may send data to the terminal devices 25 to 26 in the multicast manner or in a device to device (Device to Device, D2D) communication manner, and the network device 30 may send the downlink data to the terminal devices 31 to 33 in the multicast manner.

In addition, the terminal devices 21 to 26 may send the uplink data to the network device 20, and the terminal devices 31 to 33 may send the uplink data to the network device 30.

A service supported by the network device may be determined based on an ongoing service of a terminal device connected to the network device. A service supported by the core network device may be determined based on a service supported by a network device connected to the core network device.

The network device may be an entity that has a transceiver function, for example, a base station. This is not specifically limited herein. The terminal device may be, for example, a mobile phone, a computer, an e-reader, a printer, intelligent kitchenware, an audio apparatus, or a vehicle with an information receiving and transmitting function. This is not specially limited in this application. For example, the core network device may be an access and mobility management function (access and mobility management function, AMF), a service management function (service management function, SMF), a user port function (user port function, UPF), or the like. This is not specially limited herein.

The foregoing service may be a multicast service (multimedia broadcast multicast service, MBMS), a broadcast service, or a unicast service. This is not specially limited in this application. The multicast service or the broadcast service is a one-to-many communication service. For example, the multicast service may be a live broadcast service or a video on demand service, or may be a service that requires one-to-many communication in an industrial scenario, a public safety scenario, or an Internet of Vehicles scenario, for example, batch command delivery, batch software update, or the one-to-many communication. The unicast service is a one-to-one communication service.

Between the network device and the terminal device, the MBMS service may be sent to the terminal device in a form of unicast by establishing a dedicated bearer for the terminal device. Specifically, when a plurality of terminal devices need to receive an MBMS service, if the MBMS service is sent in the form of unicast, dedicated bearers need to be established for a large quantity of terminal devices. Between the network device and the terminal device, the MBMS service may alternatively be sent to the terminal device in a form of broadcast by establishing a dedicated bearer for the MBMS. Specifically, if the MBMS service is sent to the terminal device in a form of multicast, only the dedicated bearer for the MBMS needs to be established. All terminal devices that process the MBMS service may receive the MBMS by using the dedicated bearer for the MBMS.

It should be noted that the foregoing scenario and description of the scenario are merely examples, and are not intended to limit this application. To be specific, this application may be further applicable to a scenario in which there are more than two network devices and a plurality of core network devices, and a scenario in which a plurality of network devices cooperate and perform data communication with a plurality of terminal devices.

Figure 2:
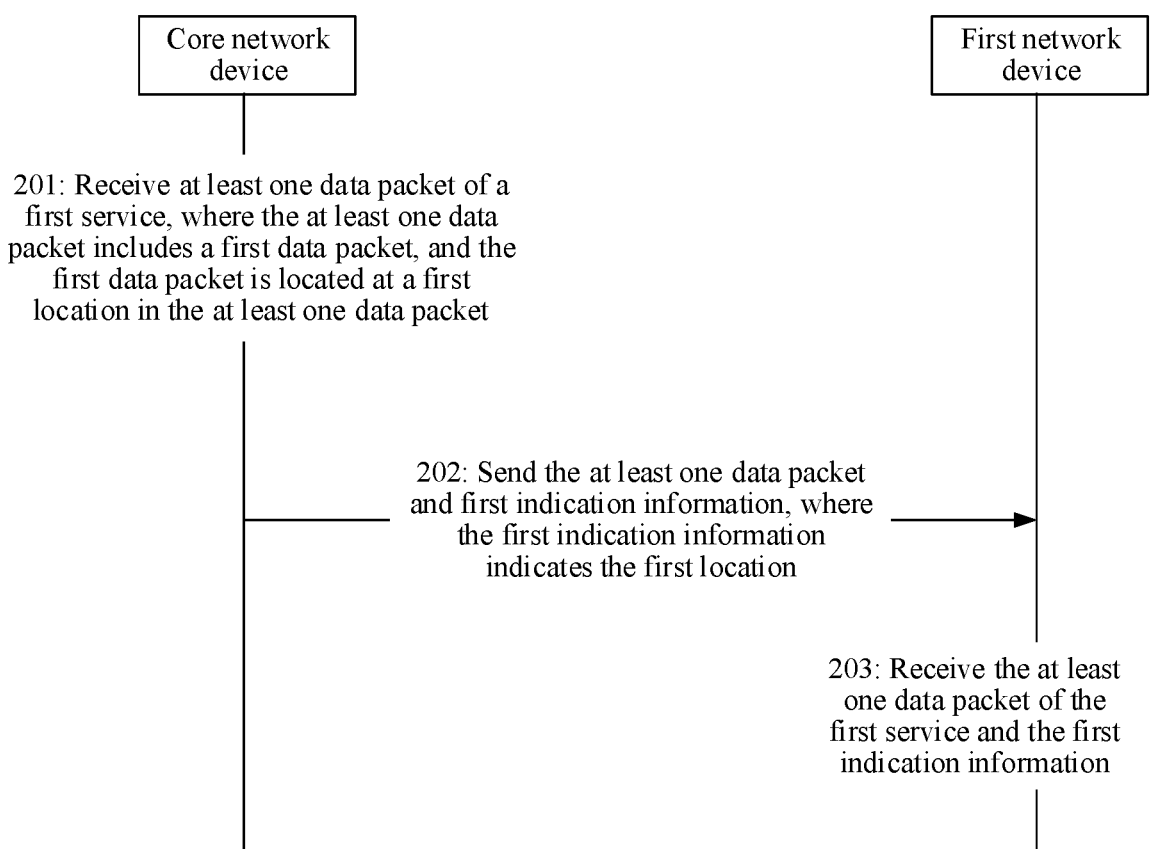
FIG. 2 is a schematic flowchart 1 of a communication method according to this application.

FIG. 2 is a schematic flowchart 1 of a communication method according to this application. As shown in FIG. 2, the communication method may include the following steps.

Step 201: A core network device receives at least one data packet of a first service, where the at least one data packet includes a first data packet, and the first data packet is located at a first location in the at least one data packet.

In this embodiment of this application, a data server or a data network of the first service sends the at least one data packet of the first service to the core network device through a link between the data server or the data network of the first service and the core network device, and the core network device receives the at least one data packet of the first service. The at least one data packet of the first service includes the first data packet. The first data packet is located at the first location in the at least one data packet of the first service. There may be one or more first data packets. A location of each first data packet in the at least one data packet of the first service is the first location corresponding to the first data packet.

Specifically, a location of each data packet (including the first data packet) in the at least one data packet (including the first data packet) of the first service may be understood as follows: Data packets in the at least one data packet of the first service are sorted based on a sending sequence, and a sorting location of each data packet is a location of the corresponding data packet in the at least one data packet of the first service. The first service is any one of the foregoing services. Because the service has been specifically described above, details about the first service are not described herein again.

Specifically, a process in which the data server or the data network of the first service sends the at least one data packet of the first service to the core network device may include: selecting the first data packet from the at least one data packet of the first service, where there may be at least one first data packet; and sending each data packet (including the selected first data packet) in the at least one data packet of the first service to the core network device, or sending each data packet (including the selected first data packet) in the at least one data packet of the first service and first information corresponding to each selected first data packet to the core network device, where the first information corresponding to the first data packet indicates a ranking, a location, or a sequence number of the first data packet in the at least one data packet.

A manner of selecting the first data packet from the at least one data packet of the first service may include: selecting each of the at least one data packet of the first service as the first data packet; or selecting an $M^{th}$ data packet in the at least one data packet of the first service as the first data packet, and selecting one first data packet at an interval of a preset quantity of data packets in data packets after the $M^{th}$ data packet, where M is an integer and is greater than or equal to 1; or selecting a data packet that is at an odd-numbered location in the at least one data packet of the first service as the first data packet. It should be noted that the foregoing manner of selecting the first data packet is merely an example, and is not intended to limit the present invention, that is, the first data packet may alternatively be selected in another manner.

An occasion for sending the first information corresponding to each first data packet may include: sending the first information corresponding to the first data packet when sending the first data packet; or sending the first information corresponding to the first data packet each time after sending one first data packet; or the like. This is not specially limited in this application.

A manner of sending the first information corresponding to the first data packet may include: sending the first information corresponding to the first data packet as one piece of independent information; or including the first information corresponding to the first data packet in the first data packet (for example, a packet header or a payload of the first data packet) for sending; or the like. This is not specially limited in this application.

A process in which the data server or the data network of the first service sends each data packet (including the selected first data packet) in the at least one data packet of the first service to the core network device may include: sequentially sending data packets in the at least one data packet of the first service to the core network device, that is, after one data packet is sent, sending a next data packet; or sending a preset quantity of data packets in the at least one data packet of the first service to the core network device at the same time, and sending a next preset quantity of data packets after sending of the preset quantity of data packets is completed, that is, sending a plurality of data packets to the core network device at the same time, to improve sending efficiency. The preset quantity may be specified by a standard, or may be set by the data server or the data network of the first service. A manner of setting the preset quantity is not limited herein. It should be noted that the foregoing manner of sending the at least one data packet of the first service to the core network device is merely an example, and is not intended to limit the present invention, that is, a data packet of the first service may alternatively be sent to the core network device in another manner.

It should be noted that the core network device may simultaneously receive at least one data packet of each of at least one service, that is, a data server or a data network of each of the at least one service (it should be noted that different services may alternatively be a same data server or data network) may send at least one data packet of the corresponding service to the core network device. The core network device receives the at least one data packet of the corresponding service sent by the data server or the data network of each service. The first service is any one of the at least one service. Because the data server or the data network of each service sends, on a same principle, the at least one data packet of the corresponding service to the core network device, and a principle on which the data server or the data network of the first service sends the at least one data packet of the first service to the core network device has been described above, principles on which data servers or data networks of other various services each send at least one data packet of the corresponding service to the core network device are not described herein again.

It should be noted that step 201 is an optional step.

Step 202: The core network device sends the at least one data packet and first indication information to a first network device, where the first indication information indicates the first location.

In this embodiment of this application, a manner in which the core network device sends the at least one data packet of the first service to the first network device may include: After receiving the at least one data packet of the first service (that is, after receiving all data packets of the first service), the core network device sends the at least one data packet of the first service to the first network device; or after receiving one of the at least one data packet of the first service, the core network device sends the received data packet of the first service to the first network device, that is, the core network device sends the received data packet of the first service to the first network device in a process of receiving the data packet of the first service. It should be noted that the foregoing process is merely an example, and is not intended to limit the present invention.

A manner of sending the first indication information to the first network device may be: sending the first indication information to the first network device at a first moment, where the first moment is one of a plurality of periodically configured moments, and duration between two adjacent moments in the plurality of moments is specified duration. The specified duration may be set by the core network device, or may be set by the data server or the data network of the first service. This is not specially limited herein. For example, the specified duration is 20 milliseconds or 30 milliseconds. In this manner, a plurality of periods with specified duration are obtained through division by using two adjacent moments in the plurality of periodically configured moments. Each of the plurality of moments is a start moment or an end moment of a corresponding period. Based on this, first indication information corresponding to a corresponding period may be sent at a start moment or an end moment of each period, where the first indication information corresponding to each period indicates a first location of any first data packet in data packets that are of the first service and that are sent to the first network device in the corresponding period. Alternatively, after N data packets in the at least one data packet of the first service are sent to the first network device, the first indication information is sent to the first network device (the $1^{st}$ data packet in the N data packets is not limited), where N≥0, and N is an integer, that is, after every N data packets of the first service are sent, first indication information corresponding to every N data packets of the first service is sent once. Specifically, the first indication information corresponding to every N data packets of the first service indicates a first location, a ranking, or a sequence number of any first data packet in every N data packets of the first service. If N=1, each time one data packet of the first service is sent to the first network device, first indication information corresponding to the sent data packet of the first service is sent to the first network device. The first indication information corresponding to the sent data packet of the first service indicates a first location of the sent data packet (namely, the first data packet), that is, each data packet of the first service is the first data packet. Then, each time one first data packet is sent to the first network device, the first indication information is sent once. The first indication information indicates the first location of the sent first data packet. If N=5, each time five data packets of the first service are sent to the first network device, first indication information corresponding to the five sent data packets of the first service is sent to the first network device once. The first indication information corresponding to the five sent data packets of the first service indicates a first location of any first data packet in the five sent data packets of the first service. It should be noted that the foregoing manner is merely an example, and is not intended to limit the present invention, that is, the first indication information may alternatively be sent in another manner.

In addition, when the $1^{st}$ data packet of the first service is sent to the first network device, first indication information corresponding to the $1^{st}$ data packet may be sent once, that is, the $1^{st}$ data packet of the first service is determined as the first data packet. The first indication information indicates a location of the Pt data packet of the first service, to notify the first network device of a start location of the received Pt data packet of the first service. Subsequently, the first indication information may be sent to the first network device in the foregoing two manners.

The first indication information may include the following two manners.

In the first manner, the first indication information includes a sequence number of the first data packet, and the sequence number of the first data packet indicates the first location of the first data packet in the at least one data packet of the first service. Specifically, data packets in the at least one data packet of the first service may be sorted based on a sending sequence, to obtain a sequence number of each of the at least one data packet of the first service, where the sequence number of each data packet indicates a location of each data packet in the at least one data packet of the first service. Because the first data packet is a data packet in the at least one data packet of the first service, and a location of the first data packet in the at least one data packet of the first service is the first location, the sequence number of the first data packet indicates the first location of the first data packet in the at least one data packet of the first service.

The sequence number of the first data packet may be a sequence number independent of any original sequence number in the first data packet. The sequence number of the first data packet may alternatively be any original sequence number in the first data packet. The original sequence number in the first data packet may be, for example, a general packet radio service tunneling protocol-user plane (general packet radio service tunneling protocol-user plane, GTP-U) sequence number of the first data packet. This is not specially limited herein. If the sequence number of the first data packet is the GTP-U sequence number of the first data packet, after the core network device receives the at least one data packet of the first service, the GTP-U sequence number of the first data packet is determined based on the first location or a ranking of the first data packet in the at least one data packet of the first service. To be specific, the GTP-U sequence number of the first data packet indicates the first location of the first data packet in the at least one data packet of the first service.

In the second manner, the first indication information includes a first offset and a sequence number of the first data packet, and the first offset is a difference between the sequence number of the first data packet and a sequence number corresponding to the first location of the first data packet. The sequence number of the first data packet herein may be one of original sequence numbers in the first data packet or a preset sequence number. The original sequence numbers in the first data packet may include a GTP-U sequence number of the first data packet, and the like. This is not specially limited herein. The preset sequence number may be a known sequence number sent by the core network device to the first network device. It should be noted that the sequence number of the first data packet herein does not indicate the first location of the first data packet in the at least one data packet of the first service. Herein, the sequence number corresponding to the first location of the first data packet may be understood as the sequence number of the first data packet in the foregoing first manner, that is, the sequence number corresponding to the first location of the first data packet indicates the first location of the first data packet in the at least one data packet of the first service. Because the sequence number of the first data packet is described in the first manner, the sequence number corresponding to the first location of the first data packet is not described herein again. Based on this, after receiving the first indication information, the first network device may determine, based on the first offset and the sequence number of the first data packet in the first indication information, the sequence number corresponding to the first location of the first data packet, and further determine a location of the first data packet in the at least one data packet of the first service based on the sequence number corresponding to the first location of the first data packet.

It should be noted that the specific representation manners of the first indication information are merely examples, and are not intended to limit the present invention.

The first indication information may be sent in the following three manners.

In the first manner, the first indication information may be sent as information independent of the first data packet, for example, may be sent by using control information or control signaling.

In the second manner, the first indication information is included in a packet header, a payload, or data of the first data packet, that is, the first indication information is carried in the packet header, the payload, or the data of the first data packet for sending.

In the third manner, the first indication information is included in a packet header, a payload, or data of a preset data packet. Specifically, the preset data packet is set based on the first indication information, the first indication information is carried in the packet header, the payload, or the data of the preset data packet, and the first indication information is sent by sending the preset data packet to the first network device. Specifications such as a type and a size of the preset data packet may be preset based on an actual requirement. This is not specially limited herein.

A manner of generating the first indication information includes: If the core network device receives the first information corresponding to the first data packet, the core network device generates, based on the first information corresponding to the first data packet, the first indication information corresponding to the first data packet; or if the core network device does not receive the first information corresponding to the first data packet, the core network device generates the first indication information based on the first location of the first data packet.

It should be noted that the core network device needs to send a received data packet to the first network device. However, before the core network device sends the received data packet to the first network device, some protocol layer processing information related to the core network device needs to be added to a packet header of the data packet, but a payload or data of the data packet remains unchanged. Therefore, it may be understood that the data packet received by the core network device is different from the same data packet sent to the first network device. To be specific, payloads or data of the data packets are the same, but packet headers of the data packets are different. For ease of description, the data packet received by the core network device is set to have a same name with the data packet (that is, the same data packet) that is sent to the first network device and that has a same payload or same data. In other words, a payload or data of the data packet received in step 201 is the same as that of the data packet with a same name sent in step 202, but packet headers are different.

It should be noted that the core network device may simultaneously send at least one data packet of each of the at least one service and the first indication information to the first network device. The first service is any one of the at least one service. Because the core network device sends, on a same principle, the at least one data packet of each service and the first indication information to the first network device, and a principle on which the core network device sends the at least one data packet of the first service and the first indication information to the first network device has been described above, a principle on which the core network device sends at least one data packet of each of other various services and the first indication information to the first network device is not described herein again.

In addition, the core network device may simultaneously send the at least one data packet of the first service and the first indication information to each of at least one network device. The first network device is any one of the at least one network device. Because the core network device sends, on a same principle, the at least one data packet of the first service and the indication information to each network device, and a principle on which the core network device sends the at least one data packet of the first service and the first indication information to the first network device has been described above, a principle on which the core network device sends the at least one data packet of the first service and the first indication information to each of other network devices is not described herein again. In addition, types of services supported by different network devices may be completely the same, may be completely different, or may not be completely the same.

Step 203: The first network device receives the at least one data packet of the first service and the first indication information from the core network device, where the first indication information indicates the first location, the ranking, or the sequence number of the first data packet in the at least one data packet of the first service, and the at least one data packet includes the first data packet.

In this embodiment of this application, the first network device receives the first indication information sent by the core network device, where the first indication information indicates the first location of the first data packet in the at least one data packet of the first service. In this way, the first network device may determine progress information of the currently processed first service, so that processing related to the first service can be performed more accurately and effectively based on the progress information of the first service. In this way, a service is better provided for a user, and user experience is improved.

After successfully receiving the data packet and/or the first indication information from the core network device, the first network device may send receiving success information to the core network device, to notify the core network device that the first network device has successfully received the data packet and/or the first indication information sent by the core network device. If the core network device does not receive the receiving success information sent by the first network device, the core network device determines that the first network device does not successfully receive the data packet and/or the first indication information sent by the core network device, and the core network device needs to resend the unsuccessfully received data packet and/or first indication information to the first network device.

The first network device receives the at least one data packet of the first service and the first indication information, and performs next processing based on the at least one data packet of the first service and the first indication information. The following describes a communication procedure of the first network device in the following three manners.

In the first manner, the first network device sends second indication information to a second network device, where the second indication information indicates a second sequence number, the second sequence number is a maximum sequence number of a data packet that is of the first service and that is received by the first network device from the core network device, and the second sequence number has a correspondence with the first service. For example, the second sequence number may be marked in the second indication information by using information about the first service, to indicate the correspondence between the second sequence number and the first service. The correspondence between the second sequence number and the first service is indicated in the second indication information, so that the second network device may determine, based on the correspondence, a specific first service with the second sequence number being the maximum sequence number. In a scenario in which a plurality of different first services are simultaneously performed, the first network device may determine, based on a maximum sequence number of a data packet that is of each first service and that is received from the core network device, a second sequence number corresponding to each first service, and generate the second indication information based on the second sequence number corresponding to each first service. The second sequence number corresponding to each first service may be marked in the second indication information by using information about each first service, to indicate a correspondence between each second sequence number in the second indication information and a corresponding first service. The correspondence between each second sequence number and the first service is indicated in the second indication information, so that the second network device may determine, based on the correspondence, a specific first service with the second sequence number being a maximum sequence number.

Further optionally, the correspondence between the sequence number and the service may be preconfigured or predefined. For example, a correspondence exists between a maximum sequence number of a data packet of a service and the service. For another example, a correspondence exists between a minimum sequence number of a data packet of a service and the service. Specifically, a correspondence exists between at least one service and a sequence number of a data packet of the at least one service.

In this embodiment of this application, a core network device connected to the second network device may be the same as or different from a core network device connected to the first network device. This is not specially limited herein. There is at least one second network device. Types of services supported by the first network device and the second network device may be completely the same, may be completely different, or may not be completely the same.

A purpose of sending the second indication information by the first network device to the second network device is to enable the second network device to determine, based on the second indication information, the maximum sequence number of the data packet that is of the first service and that has been received by the first network device, and to determine, based on the maximum sequence number of the data packet that is of the first service and that has been received by the first network device, current progress of the first service supported by the first network device. Therefore, the second network device better performs processing related to the first service supported by the first network device, based on the current progress of the first service supported by the first network device. For example, in a process in which the terminal device is handed over from the first network device to the second network device, the second network device learns of progress of a service of the terminal device on the first network device based on the second indication information. After the terminal device is handed over, the second network device may determine, based on the progress of the service of the terminal device on the first network device, whether service data buffering needs to be performed, or determine to send a data packet to the terminal device in a unicast or multicast transmission manner. Based on this, a process of sending the second indication information to the second network device may include: first determining the maximum sequence number (that is, the second sequence number) of the data packet that is of the first service and that has been received by the first network device; generating the second indication information based on the maximum sequence number of the data packet that is of the first service and that has been received by the first network device; and finally sending the second indication information to the second network device.

Specifically, a principle of determining the maximum sequence number of the data packet that is of the first service and that has been received by the first network device is as follows: The first network device receives at least one piece of first indication information that is of the first service and that is sent by the core network device, where each of the at least one piece of first indication information indicates a first location of a corresponding first data packet. Based on this, indication information with a largest first location is determined as target indication information based on the first location of the first data packet indicated by each of the at least one piece of first indication information. A sequence number of a first data packet corresponding to the target indication information is determined based on the first location indicated by the target indication information. Further, a maximum sequence number of the received data packet of the first service is determined based on the determined sequence number of the first data packet. For example, the sequence number of the first data packet corresponding to the target indication information is 10, and two more data packets are received after the first data packet corresponding to the target indication information. Therefore, a current maximum sequence number is 12.

An occasion for sending the second indication information to the second network device may include: sending the second indication information at a preset time point, for example, adding the second indication information to a handover request in a handover process or when a handover starts; or periodically (at each fixed time point) sending the second indication information to the second network device; or sending the second indication information to the second network device in response to a preset instruction (for example, a progress sending instruction or a handover acknowledgment instruction); or the like. This is not specially limited in this application.

Further, the second indication information further indicates the information about the first service. The information about the first service may include at least one of identification information of the first service, a type of the first service, packet data unit session (packet data unit session, PDU session) identification information of the first service, a PDU session type of the first service, data radio bearer (data radio bearer, DRB) identification information of the first service, or the like. The type of the first service indicates a specific type of the first service. For example, the first service may be a unicast service or a multicast service. The PDU session type of the first service indicates a type of a session, a bearer, or a connection established for the first service. Specifically, the type of the service may be determined based on the PDU session type.

It should be noted that the second indication information sent by the first network device to the second network device may relate to a plurality of first services. Specifically, if the second indication information relates to a plurality of first services, a second sequence number corresponding to each first service is indicated in the second indication information for the first service. Alternatively, a second sequence number corresponding to each first service and information corresponding to the first service are indicated in the second indication information for the first service, where the second sequence number of each first service is a maximum sequence number of a data packet that is of the corresponding first service and that is received by the first network device from the core network device.

For example, if the second indication information sent by the first network device to the second network device relates to three types of first services, a process of sending the second indication information to the second network device includes: first determining a maximum sequence number (that is, a second sequence number corresponding to each first service) of a data packet that is of each first service and that is received by the first network device; generating the second indication information based on the maximum sequence number of the data packet that is of each first service and that has been received by the first network device; and finally sending the second indication information to the second network device. The maximum sequence number of the data packet corresponding to each first service may be marked by using the information about the first service, so that the second network device determines, based on a mark of the maximum sequence number (that is, the second sequence number corresponding to each first service) of the data packet of each first service, a specific service with the second sequence number being a maximum sequence number.

The second indication information is sent to the second network device, so that the second network device may determine, based on the maximum sequence number, represented by the second indication information, of the data packet that is of the first service and that is received by the first network device from the core network device, current progress of the first service supported by the first network device. Therefore, the second network device more accurately and effectively performs processing related to the first service in the first network device, based on the current progress of the first service supported by the first network device.

In the second manner, the first network device receives third indication information sent by the second network device, where the third indication information indicates a third sequence number, the third sequence number is a maximum sequence number of a data packet that is of the first service and that is received by the second network device from the core network device, and the third sequence number has a correspondence with the first service. For example, the third sequence number may be marked in the third indication information by using information about the first service, to indicate the correspondence between the third sequence number and the first service. The correspondence between the third sequence number and the first service is indicated in the third indication information, so that the first network device may determine, based on the correspondence, a specific first service with the third sequence number being a maximum sequence number. In a scenario in which a plurality of different first services are simultaneously performed, the second network device may determine, based on a maximum sequence number of a data packet that is of each first service and that is received from the core network device, a third sequence number corresponding to each first service, and generate the third indication information based on the third sequence number corresponding to each first service. The third sequence number corresponding to each first service may be marked in the third indication information by using information about each first service, to indicate a correspondence between each third sequence number in the third indication information and a corresponding first service. The correspondence between each third sequence number and the first service is indicated in the third indication information, so that the first network device may determine, based on the correspondence, a specific first service with the third sequence number being a maximum sequence number.

In this embodiment of this application, a core network device connected to the second network device may be the same as or different from a core network device connected to the first network device. This is not specially limited herein. There is at least one second network device. Types of services supported by the first network device and the second network device may be completely the same, may be completely different, or may not be completely the same.

A purpose of sending the third indication information by the second network device to the first network device is to enable the first network device to determine, based on the third indication information, the maximum sequence number of the data packet that is of the first service and that has been received by the second network device, and to determine, based on the maximum sequence number of the data packet that is of the first service and that has been received by the second network device, current progress of the first service supported by the second network device. Therefore, the first network device better performs processing related to the first service supported by the second network device, based on the current progress of the first service supported by the second network device. For example, in a process in which the terminal device is handed over from the second network device to the first network device, the first network device learns of progress of a service of the terminal device on the second network device based on the third indication information. After the terminal device is handed over, the first network device may determine, based on the progress of the service of the terminal device on the second network device, whether service data buffering needs to be performed, or determine to send a data packet to the terminal device in a unicast or multicast transmission manner. Based on this, a process of sending the third indication information to the first network device may include: first determining the maximum sequence number of the data packet that is of the first service and that has been received by the second network device; generating the third indication information based on the maximum sequence number of the data packet that is of the first service and that has been received; and finally sending the third indication information to the first network device.

Specifically, a principle of determining the maximum sequence number of the data packet that is of the first service and that has been received by the second network device is as follows: Because the second network device receives at least one piece of first indication information that is of the first service and that is sent by the core network device, each of the at least one piece of first indication information indicates a first location of a corresponding first data packet. Based on this, indication information with a largest first location is determined as target indication information based on the first location of the first data packet indicated by each of the at least one piece of first indication information. A sequence number of a first data packet corresponding to the target indication information is determined based on the first location indicated by the target indication information. Further, a maximum sequence number of the received data packet of the first service is determined based on the determined sequence number of the first data packet. For example, the sequence number of the first data packet indicated by the target indication information is 10, and two more data packets are received after the first data packet. Therefore, a current maximum sequence number is 12.

An occasion for sending the third indication information to the first network device may include: sending the third indication information at a preset time point, for example, adding the third indication information to a handover request in a handover process or when a handover starts; or periodically (at each fixed time point) sending the third indication information to the first network device; or sending the third indication information to the first network device in response to a preset instruction (for example, a progress sending instruction or a handover acknowledgment instruction); or the like. This is not specially limited in this application.

Further, the third indication information further indicates the information about the first service. The information about the first service may include at least one of identification information of the first service, a type of the first service, PDU session identification information of the first service, a PDU session type of the first service, DRB identification information of the first service, or the like. The type of the first service indicates a specific type of the first service. For example, the first service may be a unicast service or a multicast service. The PDU session type of the first service indicates a type of a session, a bearer, or a connection established for the first service. Specifically, the type of the service may be determined based on the PDU session type.

It should be noted that the third indication information sent by the second network device to the first network device may relate to a plurality of first services. Specifically, if the third indication information relates to a plurality of first services, a third sequence number corresponding to each first service is indicated in the third indication information for the first service. Alternatively, a third sequence number corresponding to each first service and information corresponding to the first service are indicated in the third indication information for the first service, where the third sequence number of each first service is a maximum sequence number of a data packet that is of the corresponding first service and that is received by the second network device from the core network device.

For example, if the third indication information sent by the second network device to the first network device relates to four types of first services, a process of sending the third indication information to the first network device includes: first determining a maximum sequence number (that is, a third sequence number corresponding to each first service) of a data packet that is of each first service and that is received by the second network device; generating the third indication information based on the maximum sequence number of the data packet that is of each first service and that has been received by the second network device; and finally sending the third indication information to the first network device. The maximum sequence number of the data packet corresponding to the first service may be marked by using the information about each first service, so that the first network device determines, based on a mark of the maximum sequence number (that is, the third sequence number corresponding to each first service) of the data packet of each first service, a specific service with the third sequence number corresponding to the first service being a maximum sequence number.

The third indication information is sent to the first network device, so that the first network device may determine, based on the maximum sequence number, represented by the third indication information, of the data packet that is of the first service and that is received by the second network device from the core network device, current progress of the first service supported by the second network device. Therefore, the first network device more accurately and effectively performs processing related to the first service in the second network device, based on the current progress of the first service supported by the second network device.

Further, if the first network device is a source network device, and the second network device is a target network device, after receiving the third indication information sent by the second network device, the first network device may further determine a third data packet based on the third indication information, and send the third data packet to the second network device. Specifically, the first network device determines the maximum sequence number of the data packet that is of the first service and that is received by the first network device from the core network device, and the maximum sequence number is referred to as a first maximum sequence number. The first network device determines, based on the third indication information, the maximum sequence number of the data packet that is of a same first service and that is received by the second network device from the core network device, and the maximum sequence number is referred to as a second maximum sequence number. Whether the first maximum sequence number is greater than the second maximum sequence number is determined.

If the first maximum sequence number is less than the second maximum sequence number, the first network device may determine a specific data packet whose sequence number is less than or equal to the first maximum sequence number in the first service as the third data packet, and send the third data packet to the second network device. Further, the first network device may send the second indication information to the second network device. The second indication information indicates the second sequence number, and the second sequence number is the maximum sequence number of the data packet that is of the first service and that is received by the first network device from the core network device. After determining that the first maximum sequence number is less than the second maximum sequence number, the second network device buffers data packets corresponding to all sequence numbers after the first maximum sequence number in the first service.

The specific data packet may be determined based on the first maximum sequence number and a specific application scenario. For example, if the application scenario is that a network device connected to the terminal device changes from the first network device to the second network device, that is, the first network device is a source network device of the terminal device, and the second network device is a target network device of the terminal device, and a service being processed by the terminal device is the first service, a manner of determining the specific data packet is: determining the specific data packet based on the first maximum sequence number and information exchanged between the first network device and the terminal device based on the first service, where the information exchanged for the first service indicates a sequence number of a data packet that is of the first service, that has been sent by the first network device to the terminal device, and whose correct reception acknowledgment message sent by the terminal device has been received; and based on this, determining, a data packet that is in the first service, whose sequence number is less than or equal to the first maximum sequence number, and that is not sent to the terminal device, and a data packet that is in the first service, whose sequence number is less than or equal to the first maximum sequence number, and that has been sent to the terminal device but whose correct reception acknowledgment message sent by the terminal device is not received, as the specific data packets. In conclusion, the finally determined third data packets are the data packet that is in the first service, whose sequence number is less than or equal to the first maximum sequence number, and that is not sent to the terminal device, and the data packet that is in the first service, whose sequence number is less than or equal to the first maximum sequence number, and that has been sent to the terminal device but whose correct reception acknowledgment message sent by the terminal device is not received.

For example, the first maximum sequence number is 10, that is, the maximum sequence number of the data packet that is of the first service and that is received by the first network device from the core network device is 10, the second maximum sequence number is 20, that is, the maximum sequence number of the data packet that is of the first service and that is received by the second network device from the core network device is 20, and the first network device has sent data packets whose sequence numbers are 1 to 5 in the first service to the terminal device, and has received correct reception feedbacks from the terminal device. Based on this, the first network device determines a data packet whose sequence number is greater than or equal to 6 and less than or equal to 10 in the first service as the third data packet, and sends the data packet whose sequence number is greater than or equal to 6 and less than or equal to 10 in the first service to the second network device. The second network device buffers all data packets whose sequence numbers are greater than or equal to 11 in the first service. After the terminal device is handed over from the first network device to the second network device, the second network device sends a data packet whose sequence number is greater than or equal to 6 in the first service to the terminal device. Optionally, before sending the data packet, the second network device receives a status report sent by the terminal device, and further determines, based on the status report, a specific data packet to be sent to the terminal device. The status report sent by the terminal device may include a sequence number of a data packet that is of the first service and that has been successfully received by the terminal device. The status report sent by the terminal device is received, so that the second network device may again check, based on the status report, the data packet that is of the first service and that is sent to the terminal device, to further ensure accuracy of the data packet sent to the terminal device.

If the first sequence number is greater than or equal to the second maximum sequence number, the first network device may determine a specific data packet whose sequence number is less than or equal to the second maximum sequence number in the first service as the third data packet, and send the third data packet to the second network device. Further, the first network device may send the second indication information to the second network device. The second indication information indicates the second sequence number, and the second sequence number is the maximum sequence number of the data packet that is of the first service and that is received by the first network device from the core network device. After determining that the first maximum sequence number is greater than or equal to the second maximum sequence number, the second network device buffers data packets corresponding to all sequence numbers after the second maximum sequence number in the first service.

The specific data packet may be determined based on the second maximum sequence number and a specific application scenario. For example, if the application scenario is that a network device connected to the terminal device changes from the first network device to the second network device, that is, the first network device is a source network device of the terminal device, and the second network device is a target network device of the terminal device, and a service supported by the terminal device is the first service, a manner of determining the specific data packet is: determining the specific data packet based on the second maximum sequence number and information exchanged between the first network device and the terminal device based on the first service, where the information exchanged for the first service indicates a sequence number of a data packet that is of the first service, that has been sent by the first network device to the terminal device, and whose correct reception acknowledgment message sent by the terminal device has been received; and based on this, determining, a data packet that is in the first service, whose sequence number is less than or equal to the second maximum sequence number, and that is not sent to the terminal device, and a data packet that is in the first service, whose sequence number is less than or equal to the second maximum sequence number, and that has been sent to the terminal device but whose correct reception acknowledgment (acknowledge, ACK) sent by the terminal device is not received, as the specific data packets. In conclusion, the finally determined third data packets are the data packet that is in the first service, whose sequence number is less than or equal to the second maximum sequence number, and that is not sent to the terminal device, and the data packet that is in the first service, whose sequence number is less than or equal to the second maximum sequence number, and that has been sent to the terminal device but whose correct reception acknowledgment sent by the terminal device is not received.

For example, if the first maximum sequence number is 20, that is, the maximum sequence number of the data packet that is of the first service and that is received by the first network device from the core network device is 20, the second maximum sequence number is 15, that is, the maximum sequence number of the data packet that is of the first service and that is received by the second network device from the core network device is 15, and the first network device has sent data packets whose sequence numbers are 1 to 6 in the first service to the terminal device, and has received correct reception feedbacks from the terminal device, based on this, the first network device determines a data packet whose sequence number is greater than or equal to 7 and less than or equal to 15 in the first service as the third data packet. The data packet whose sequence number is greater than or equal to 7 and less than or equal to 15 in the first service is sent to the second network device, and the second network device buffers a data packet whose sequence number is greater than or equal to 16 in the first service. After the terminal device is handed over from the first network device to the second network device, the second network device sends a data packet whose sequence number is greater than or equal to 7 in the first service to the terminal device. Optionally, before sending the data packet, the second network device receives a status report sent by the terminal device, and further determines, based on the status report, a specific data packet to be sent to the terminal device. The status report sent by the terminal device may include a sequence number of a data packet that is of the first service and that has been successfully received by the terminal device. The status report sent by the terminal device is received, so that the second network device may again check, based on the status report, the data packet that is of the first service and that is sent to the terminal device, to further ensure accuracy of the data packet sent to the terminal device.

In a third manner, the first network device sends second indication information to the second network device, where the second indication information indicates a second sequence number, and the second sequence number is a maximum sequence number of a data packet that is of the first service and that is received by the first network device from the core network device. The first network device receives third indication information sent by the second network device, where the third indication information indicates a third sequence number, and the third sequence number is a maximum sequence number of a data packet that is of the first service and that is received by the second network device from the core network device.

In this embodiment of this application, a manner in which the first network device interacts with the second network device may include the following three manners.

Manner 1: The first network device generates the second indication information based on the maximum sequence number of the data packet that is of the first service and that is received by the first network device from the core network device, and sends the second indication information to the second network device. The second network device generates the third indication information based on the maximum sequence number of the data packet that is of the first service and that is received by the second network device from the core network device, and sends the third indication information to the first network device, and the first network device receives the third indication information sent by the second network device. An execution sequence of sending, by the first network device, the second indication information to the second network device and receiving, by the first network device, the third indication information sent by the second network device is not limited herein.

Manner 2: The first network device sends the information about the first service (there is at least one type of first service) supported by the first network device to the second network device. The second network device determines, based on the information about the first service supported by the first network device, the first service supported by the first network device and the second network device jointly. The second network device determines the maximum sequence number of the data packet that is of the jointly supported first service and that is received from the core network device, generates the third indication information based on the determined maximum sequence number of the data packet of the jointly supported first service, and sends the third indication information to the first network device. The first network device receives the third indication information, determines the jointly supported first service based on the third indication information, and generates the second indication information based on the maximum sequence number of the data packet that is of the jointly supported first service and that is received from the core network device. The first network device sends the second indication information to the second network device.

Manner 3: The first network device generates the second indication information based on the maximum sequence number of the data packet that is of the first service and that is received by the first network device from the core network device, and sends the second indication information to the second network device. The second network device determines, based on the second indication information, the first service supported by the first network device, and determines, based on the first service supported by the first network device, the first service jointly supported by the first network device and the second network device. The second network device determines the maximum sequence number of the data packet that is of the jointly supported first service and that is received from the core network device, generates the third indication information based on the determined maximum sequence number of the data packet of the jointly supported first service, and sends the third indication information to the first network device. The first network device receives the third indication information.

Because the foregoing principle of determining the maximum sequence number of the first service has been described above, details are not described herein again.

Further, the third indication information further indicates whether the second network device supports the first service. Specifically, after the first network device sends the second indication information to the second network device, the second network device may determine, based on the information about the first service in the second indication information, whether the second network device supports the first service corresponding to the second indication information sent by the first network device (that is, determine the first service jointly supported by the second network device and the first network device), and adds a determining result to the third indication information and sends the third indication information to the first network device.

It should be noted that the first service supported by the first network device and the first service supported by the second network device may be the same, may be different, or may not be completely the same. This is not specially limited herein.

It can be learned from the foregoing that, the second indication information is sent to the first network device and the third indication information sent by the second network device is received by the first network device, so that the first network device and the second network device may send progress of services supported by the first network device and the second network device to each other. The second network device may return the service of the first network device supported by the second network device to the first network device. Interworking of service progress information between the first network device and the second network device is implemented, so that the first network device and the second network device can accurately and efficiently process a related service.

Further, if the first network device is a source network device, and the second network device is a target network device, after receiving the third indication information sent by the second network device, the first network device may further determine a third data packet based on the third indication information, and send the third data packet to the second network device. Because this step has been described above, details are not described herein again.

In addition, when the first network device is a target network device and the second network device is a source network device, after the second indication information is sent to the second network device, the method may further include: The first network device determines a fourth data packet based on the third indication information, and buffers the fourth data packet. The third indication information indicates the third sequence number, and the third sequence number is the maximum sequence number of the data packet that is of the first service and that is received by the second network device from the core network device. Specifically, the first network device determines the maximum sequence number of the data packet that is of the first service and that is received by the first network device from the core network device, and the maximum sequence number is referred to as the first maximum sequence number. The first network device determines, based on the third indication information, the maximum sequence number of the data packet that is of a same first service and that is received by the second network device from the core network device, and the maximum sequence number is referred to as the second maximum sequence number. Whether the first maximum sequence number is greater than the second maximum sequence number is determined.

If the first maximum sequence number is less than the second maximum sequence number, all data packets with sequence numbers greater than the first maximum sequence number are determined as fourth data packets, and the fourth data packets are buffered.

For example, if the first maximum sequence number is 10, that is, the maximum sequence number of the data packet that is of the first service and that is received by the first network device from the core network device is 10, and the second maximum sequence number is 20, that is, the maximum sequence number of the data packet that is of the first service and that is received by the second network device from the core network device is 20, the first network device buffers a data packet whose sequence number is 11 and all data packets whose sequence numbers are greater than 11.

If the first maximum sequence number is greater than or equal to the second maximum sequence number, all data packets with sequence numbers greater than the second maximum sequence number are determined as fourth data packets, and the fourth data packets are buffered.

For example, if the first maximum sequence number is 20, that is, the maximum sequence number of the data packet that is of the first service and that is received by the first network device from the core network device is 20, and the second maximum sequence number is 11, that is, the maximum sequence number of the data packet that is of the first service and that is received by the second network device from the core network device is 11, the first network device buffers a data packet whose sequence number is 12 and all data packets whose sequence numbers are greater than 12.

It should be noted that the foregoing three manners are merely examples, and are not intended to limit the present invention.

In conclusion, when the terminal device is handed over from the first network device to the second network device, the progress information is exchanged between the first network device and the second network device, so that the first network device and the second network device determine, based on the exchanged progress information, a specific data packet that needs to be forwarded and a specific data packet that needs to be buffered. In this way, after the terminal device is handed over from the first network device to the second network device, a case in which a data packet received by the terminal device is interrupted or lost is avoided, and a service interruption and a case in which the terminal device receives a redundant data packet are avoided, then a resource waste is avoided.

The following describes in detail a process in which a network device connected to the terminal device changes from the first network device to the second network device by using an example.

Figure 3:
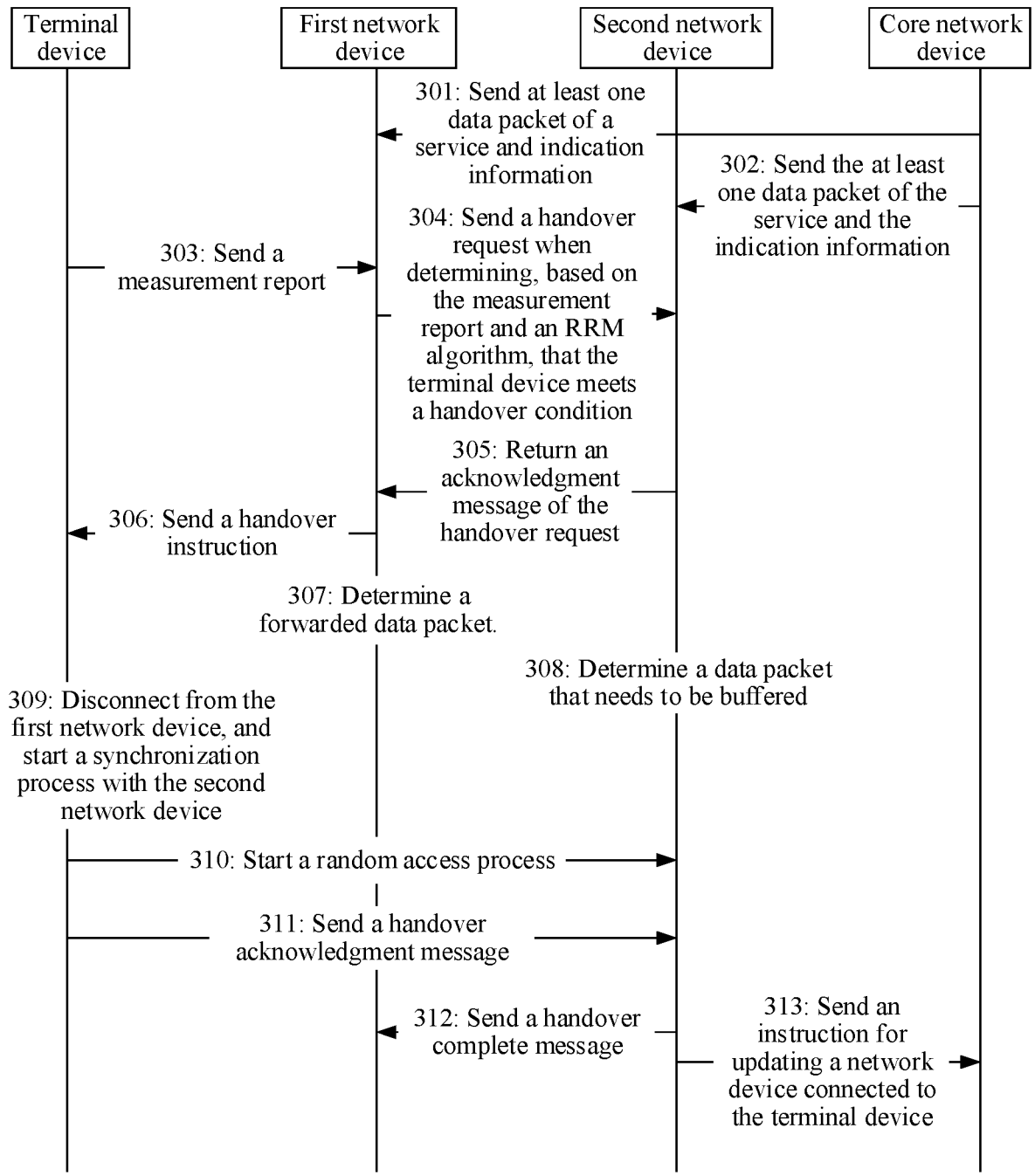
FIG. 3 is a schematic flowchart of a change of a network device connected to a terminal device from a first network device to a second network device according to this application.

FIG. 3 is a schematic flowchart of a change of the network device connected to the terminal device from the first network device to the second network device according to this application. As shown in FIG. 3, a handover process of the terminal device may include the following steps.

301: A core network device sends at least one data packet of a service and indication information to the first network device, where the indication information indicates a first location of a first data packet in the at least one data packet of the service, the at least one data packet of the service includes the first data packet, and a quantity of first data packets is at least one. When there are a plurality of first data packets, there are also a plurality of pieces of indication information, and each piece of indication information indicates a first location of one first data packet. The service herein is a service supported by the first network device. There may be at least one type of service supported by the first network device. That is, the core network device separately sends, to the first network device, the at least one data packet and the indication information that are of services supported by the first network device. The indication information of the service indicates the first location of the first data packet in the at least one data packet of the corresponding service.

302: The core network device sends at least one data packet of a service and indication information to the second network device, where the indication information indicates a first location of a first data packet in the at least one data packet of the service, the at least one data packet of the service includes the first data packet, and a quantity of first data packets is at least one. When there are a plurality of first data packets, there are also a plurality of pieces of indication information, and each piece of indication information indicates a first location of one first data packet. The service herein is a service supported by the second network device. There may be at least one type of service supported by the second network device. That is, the core network device separately sends, to the second network device, the at least one data packet and the indication information that are of services supported by the second network device. The indication information of the service indicates the first location of the first data packet in the at least one data packet of the corresponding service.

It should be noted that step 301 and step 302 are performed in no sequence. The service supported by the first network device and the service supported by the second network device may be completely the same, may be completely different, or may not be completely the same.

303: The terminal device sends a measurement report to the first network device. Specifically, the terminal device triggers measurement reporting based on measurement information configured by a network device when a reporting condition is met, and sends the measurement report to the first network device.

304: When determining, based on the measurement report and a radio resource management (radio-resource management, RRM) algorithm, that the terminal device meets a handover condition, the first network device sends a handover request to the second network device. Specifically, when it is determined that the terminal device meets the handover condition, the second network device (namely, a target network device) is determined for the terminal device, and the handover request is sent to the second network device.

In a first implementation, the handover request carries information about a first service, where the first service is a service supported by the terminal device, the first service belongs to a service supported by the first network device, and there is at least one type of the first service. It should be noted that when there are a plurality of first services, the handover request carries information about each first service. In addition, the handover request may further carry context information of the terminal device. The second network device may be notified of information about the service supported by the terminal device, based on the information about the first service carried in the handover request.

In a second implementation, the handover request may carry information about a first service and second indication information of the first service, where the second indication information indicates a second sequence number, and the second sequence number is a maximum sequence number of a data packet that is of the first service and that is received by the first network device from the core network device. The first service is a service supported by the terminal device, the first service belongs to a service supported by the first network device, and there is at least one type of the first service. It should be noted that when there are a plurality of first services, the handover request carries information about each first service and second indication information of each first service. The second network device may be notified of information about the service supported by the terminal device and progress information, based on the information about the first service and the second indication information of the first service that are carried in the handover request.

305: The second network device returns an acknowledgment message for the handover request to the first network device.

The second network device receives the handover request, and generates the acknowledgment message for the handover request in response to the handover request. Specifically, the second network device matches the information about the first service carried in the handover request with information about each service supported by the second network device, to determine, based on a matching result, whether the second network device supports the first service, and to determine a specific first service that is supported by the second network device. Specifically, if the information about the first service matches information about any one of services supported by the second network device, it is determined that the second network device supports the first service. If the information about the first service does not match information about any one of services supported by the second network device, it is determined that the second network device does not support the first service. It should be noted that, because there is at least one first service, when there are a plurality of first services, it needs to be sequentially determined whether the second network device supports each first service.

If the second network device does not support each of the at least one first service, that is, the second network device does not support all services supported by the terminal device, an acknowledgment message for the handover request is generated, and the acknowledgment message carries information that the second network device does not support each of the at least one first service.

If the second network device supports the at least one first service, that is, the second network device supports all or some services supported by the terminal device, an acknowledgment message for the handover request is generated, and the acknowledgment message carries information about each first service supported by the second network device and third indication information of each supported first service, where the third indication information of the first service indicates a third sequence number, and the third sequence number is a maximum sequence number of a data packet that is of the first service and that is received by the second network device from the core network device.

In the foregoing process, the second network device may notify the first network device whether the second network device supports the first service, and if the second network device supports the first service, may indicate a specific first service supported by the second network device, and progress information of the supported first service.

In addition, after determining that the second network device supports the at least one first service, the second network device allocates a cell radio network temporary identifier (cell radio network temporary identifier, C-RNTI) and another parameter to the terminal device, and prepares for handover of the terminal device. Based on this, the acknowledgment message for the handover request may further carry the C-RNTI, the another parameter, and the like that are allocated to the terminal device.

306: The first network device sends a handover instruction to the terminal device.

In this embodiment of this application, after the first network device receives acknowledgment information of the handover request, if the acknowledgment information of the handover request indicates that a second terminal device supports at least one first service supported by the terminal device, the first network device sends the handover instruction to the terminal device, to indicate the terminal device to be handed over from the first network device to the second network device. In addition, the handover instruction may further include a new C-RNTI (that is, the C-RNTI allocated by the second network device to the terminal device), a system information block (system information block, SIB) of the second network device, and configuration information of the terminal device (for example, a media access control (media access control, MAC) layer configuration, a radio link control (radio link control, RLC) configuration, and a packet data convergence protocol (packet data convergence protocol, PDCP) layer configuration).

In addition, after the first network device receives the acknowledgment message for the handover request, based on the first implementation in step 304, the first network device further needs to send, to the second network device based on the information about the first service supported by the second network device that is carried in the acknowledgment message, second indication information of the first service supported by the second network device. The second indication information indicates the second sequence number, and the second sequence number is the maximum sequence number of the data packet that is of the first service and that is received by the first network device from the core network device. The second network device may be notified of progress information of the first service supported by the second network device in the first network device, by sending the second indication information of the first service supported by the second network device to the second network device.

307: The first network device determines a forwarded data packet, that is, the first network device determines a forwarded data packet of each first service supported by the second network device. Because a principle of determining and forwarding the data packet of the first service supported by the second network device is the same as a principle of determining the third data packet in the foregoing description, details are not described herein again.

After determining the forwarded data packet of the first service supported by the second network device, the first network device sends, to the second network device, the data packet that is of the first service supported by the second network device and that is determined to be forwarded.

308: The second network device determines a data packet that needs to be buffered, that is, the second network device determines a data packet that needs to be buffered and that is of each first service supported by the second network device. Because a principle of determining a data packet that needs to be buffered by the second network device and that is of the first service supported by the second network device has been described above, details are not described herein again.

309: The terminal device is disconnected from the first network device, and starts a synchronization process with the second network device. After receiving the handover instruction, the terminal device stops uplink or downlink data transmission with the first network device, and performs synchronization with the second network device.

310: The terminal device starts a random access process (a process of randomly accessing the second network device), to obtain uplink timing and uplink resource allocation. The second network device sends a timing advance (timing advance, TA) to the terminal device, and indicates, to the terminal device, a resource allocated to the terminal device. The information is used by the terminal device to send a radio resource control (radio resource control, RRC) connection reconfiguration complete message to the second network device, to indicate that the handover is completed.

311: The terminal device sends an acknowledgment message to the second network device, to indicate that the handover is completed.

312: The second network device sends a handover complete message to the first network device, so that the first network device releases the context information of the terminal device.

313: The second network device sends, to the core network device, an instruction for updating a network device connected to the terminal device, so that the core network device sends a data packet of the terminal device to the second network device.

It should be noted that an execution sequence of the foregoing steps 307 to 309 is not limited.

Figure 4:
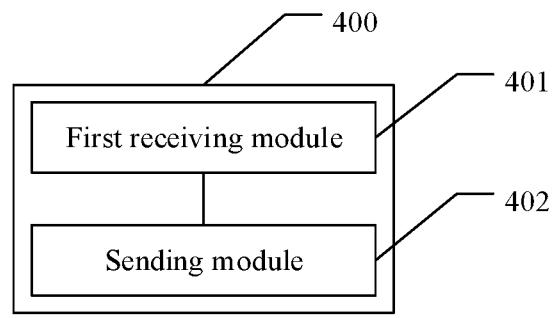
FIG. 4 is a schematic diagram 1 of a structure of a communication apparatus embodiment according to this application.

FIG. 4 is a schematic diagram 1 of a structure of a communication apparatus embodiment according to this application. The communication apparatus may be the core network device in FIG. 2, or a chip system or an integrated circuit. The chip system and the integrated circuit may be located in the core network device. Specifically, as shown in FIG. 4, the communication apparatus 400 may include a first receiving module 401 and a sending module 402.

The first receiving module 401 is configured to receive at least one data packet of a first service, where the at least one data packet includes a first data packet, and the first data packet is located at a first location in the at least one data packet. The sending module 402 is configured to send the at least one data packet and first indication information to a first network device, where the first indication information indicates the first location.

In a possible implementation, the first indication information includes a sequence number of the first data packet, and the sequence number of the first data packet indicates the first location of the first data packet in the at least one data packet.

In a possible implementation, the sending module 402 is further configured to determine a general packet radio service tunneling protocol-user plane sequence number of the first data packet based on the first location of the first data packet in the at least one data packet.

In a possible implementation, the first indication information includes a first offset and a sequence number of the first data packet, and the first offset is a difference between the sequence number of the first data packet and a sequence number corresponding to the first location.

In a possible implementation, the sequence number of the first data packet is a general packet radio service tunneling protocol-user plane sequence number of the first data packet.

In a possible implementation, the first indication information is included in a packet header, a payload, or data of the first data packet; or the first indication information is included in a packet header, a payload, or data of a preset data packet.

In a possible implementation, the sending module 402 includes a sending unit configured to send the first indication information to the first network device. The sending unit is specifically configured to send the first indication information to the first network device at a first moment, where the first moment is one of a plurality of periodically configured moments, and duration between two adjacent moments in the plurality of moments is specified duration, or the sending unit is specifically configured to send the first indication information to the first network device after sending N data packets to the first network device, where N≥0, and N is an integer.

The foregoing apparatus in this application may be configured to perform the technical solution in the method embodiment shown in FIG. 2. Implementation principles and technical effects thereof are similar, and details are not described herein again.

Figure 5:
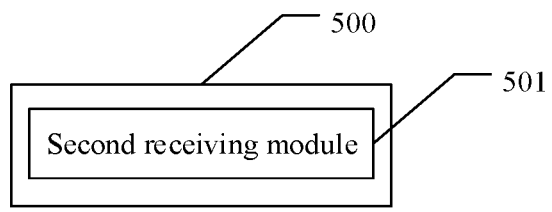
FIG. 5 is a schematic diagram 2 of a structure of a communication apparatus embodiment according to this application.

FIG. 5 is a schematic diagram 2 of a structure of a communication apparatus embodiment according to this application. The communication apparatus may be the first network device in FIG. 2, or a chip system or an integrated circuit. The chip system and the integrated circuit may be located in the first network device. Specifically, as shown in FIG. 5, the communication apparatus 500 may include a second receiving module 501.

The second receiving module 501 is configured to receive at least one data packet of a first service and first indication information from a core network device, where the first indication information indicates a first location of a first data packet in the at least one data packet, and the at least one data packet includes the first data packet.

In a possible implementation, the first indication information includes a sequence number of the first data packet, and the sequence number of the first data packet indicates the first location of the first data packet in the at least one data packet.

In a possible implementation, the first indication information includes a first offset and a sequence number of the first data packet, and the first offset is a difference between the sequence number of the first data packet and a sequence number corresponding to the first location.

In a possible implementation, the sequence number of the first data packet is a general packet radio service tunneling protocol-user plane sequence number of the first data packet.

In a possible implementation, the first indication information is included in a packet header, a payload, or data of the first data packet; or the first indication information is included in a packet header, a payload, or data of a preset data packet.

In a possible implementation, the second receiving module 501 is further configured to: after receiving the at least one data packet and the first indication information from the core network device, send second indication information to a second network device, where the second indication information indicates a second sequence number, and the second sequence number is a maximum sequence number of a data packet that is of the first service and that is received by a first network device from the core network device; and/or the second receiving module 501 is further configured to: after receiving the at least one data packet and the first indication information from the core network device, receive third indication information sent by the second network device, where the third indication information indicates a third sequence number, and the third sequence number is a maximum sequence number of a data packet that is of the first service and that is received by the second network device from the core network device.

In a possible implementation, the first network device is a source network device, the second network device is a target network device, the second indication information further indicates information about the first service, and the information about the first service includes at least one of the following:

identification information of the first service; a type of the first service; packet data unit session identification information of the first service; a packet data unit session type of the first service; and data radio bearer identification information of the first service; and the third indication information further indicates whether the second network device supports the first service.

In a possible implementation, the second sequence number corresponds to the first service; and/or the third sequence number corresponds to the first service.

In a possible implementation, the second receiving module 501 is further configured to: after receiving the third indication information sent by the second network device, determine a third data packet based on the third indication information, and send the third data packet to the second network device.

In a possible implementation, when the first network device is a target network device, and the second network device is a source network device, the second receiving module 501 is further configured to: after sending the second indication information to the second network device, determine a fourth data packet based on the third indication information, and buffer the fourth data packet.

The foregoing apparatus in this application may be configured to perform the technical solution in the method embodiment shown in FIG. 2. Implementation principles and technical effects thereof are similar, and details are not described herein again.

This application further provides a computer-readable storage medium. The computer-readable storage medium stores a computer program. When the computer program is executed by a computer, the computer is enabled to perform the steps and/or the processing in any foregoing method embodiment.

This application further provides a computer program product. The computer program product includes computer program code. When the computer program code is run on a computer, the computer is enabled to perform the steps and/or the processing in any foregoing method embodiment.

This application further provides a chip. The chip includes a processor. A memory configured to store a computer program is disposed independently of the chip. The processor is configured to execute the computer program stored in the memory, to perform the steps and/or the processing in any foregoing method embodiment.

Further, the chip may include a memory and a communication interface. The communication interface may be an input/output interface, a pin, an input/output circuit, or the like.

Figure 6:
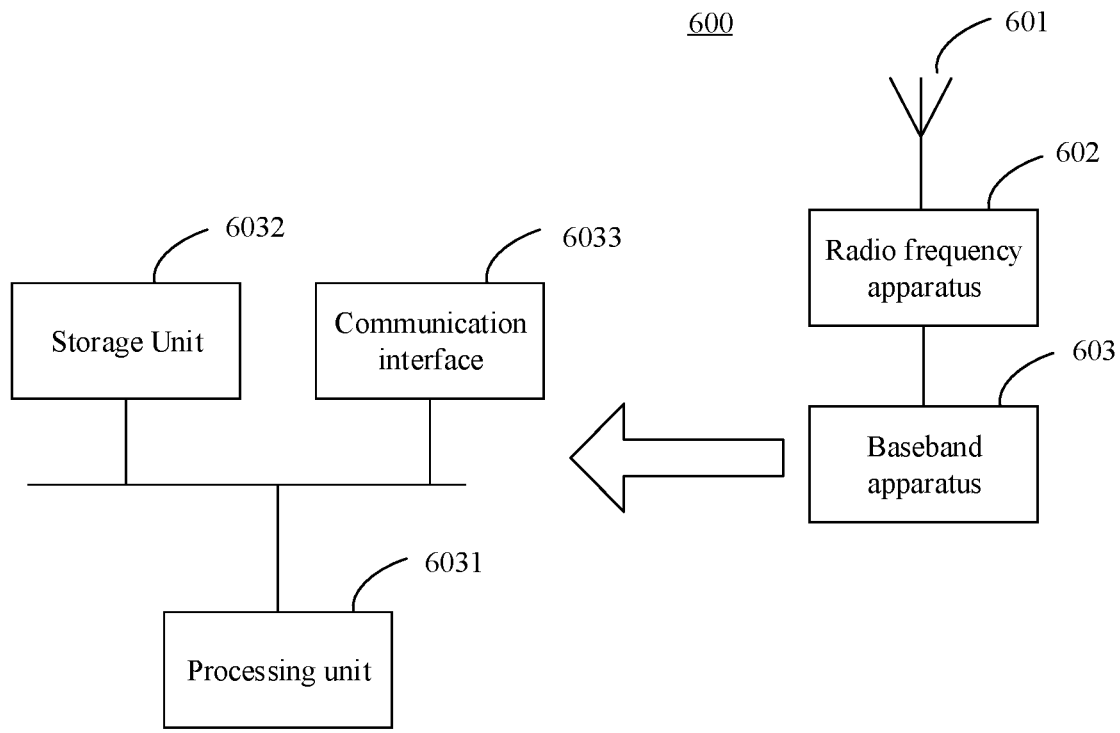
FIG. 6 is a schematic diagram of a structure of a communication device according to this application.

FIG. 6 is a schematic diagram of a structure of a communication device according to this application. A communication device 600 may be the first network device or the core network device in FIG. 2. As shown in FIG. 6, the communication device 600 includes an antenna 601, a radio frequency apparatus 602, and a baseband apparatus 603. The antenna 601 is connected to the radio frequency apparatus 602. In an uplink direction, the radio frequency apparatus 602 receives a signal from a terminal device or the first network device through the antenna 601, and sends the received signal to the baseband apparatus 603 for processing. In a downlink direction, the baseband apparatus 603 generates a signal that needs to be sent to the terminal device or the first network device, and sends the generated signal to the radio frequency apparatus 602. The radio frequency apparatus 602 transmits the signal through the antenna 601. Optionally, the antenna 601 is one type of transceiver.

The baseband apparatus 603 may include one or more processing units 6031. The processing unit 6031 may be specifically a processor.

In addition, the baseband apparatus 603 may further include one or more storage units 6032 and one or more communication interfaces 6033. The storage unit 6032 is configured to store a computer program and/or data. The storage unit 6032 may be specifically a memory. The communication interface 6033 is configured to exchange information with the radio frequency apparatus 602. The storage unit 6032 may be specifically a memory. The communication interface 6033 may be an input/output interface or a transceiver circuit.

Optionally, the storage unit 6032 may be a storage unit located on a same chip as the processing unit 6031, namely, an on-chip storage unit, or may be a storage unit located on a different chip from the processing unit 6031, namely, an off-chip storage unit. This is not limited in this application.

The processor may be configured to invoke the computer program and/or data stored in the memory, to implement the method in any foregoing method embodiment.

In an implementation process, the steps in the foregoing method embodiments may be completed by using a hardware integrated logic circuit in the processor or by using instructions in a form of software. The processor may be a general-purpose processor, a digital signal processor (digital signal processor, DSP), an application-specific integrated circuit (application-specific integrated circuit, ASIC), a field programmable gate array (field programmable gate array, FPGA) or another programmable logic device, a discrete gate or transistor logic device, or a discrete hardware component. The general-purpose processor may be a microprocessor, or the processor may be any conventional processor, or the like. The steps of the methods disclosed in embodiments of this application may be directly executed and completed by using a hardware encoding processor, or may be executed and completed by using a combination of hardware and software modules in the encoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

The memory in the foregoing embodiments may be a volatile memory or a nonvolatile memory, or may include both a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM) and is used as an external high-speed cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that, the memory in the system and method described in this specification includes but is not limited to these memories and any memory of another proper type.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, the apparatus, and the method may be implemented in other manners. For example, the foregoing apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual coupling or direct coupling or communication connection may be implemented through some interfaces. The indirect coupling or communication connection between the apparatuses or units may be implemented in electrical, mechanical, or another form.

The units described as separate parts may or may not be physically separate, and parts displayed as units may or may not be physical units, that is, may be located in one position, or may be distributed on a plurality of network units. Some or all of the units may be selected based on actual needs to achieve the objectives of the solutions of embodiments.

In addition, functional units in embodiments of this application may be integrated into one processing unit, each unit may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes: any medium that can store program code, such as a USB flash drive, a removable hard disk, a read-only memory (read-only memory, ROM), a random access memory (random access memory, RAM), a magnetic disk, or a compact disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
receiving at least one data packet of a first service, wherein the at least one data packet comprises a first data packet, and the first data packet is located at a first location in the at least one data packet; and
sending, from a core network device, the at least one data packet and first indication information to a first network device, wherein the first indication information comprises a sequence number of the first data packet, wherein the sequence number of the first data packet indicates the first location of the first data packet in the at least one data packet of the first service.

2. The method according to claim 1, wherein the first indication information is comprised in a packet header, a payload, or data of the first data packet; or
the first indication information is comprised in a packet header, a payload, or data of a preset data packet.

3. The method according to claim 1, wherein the first network device is a source network device, the second network device is a target network device, the second indication information further indicates information about the first service, and the information about the first service comprises at least one of the following:
identification information of the first service, a type of the first service, a packet data unit session identification information of the first service, a packet data unit session type of the first service, or data radio bearer identification information of the first service.

4. A communication method, comprising:
receiving, at a first network device, at least one data packet of a first service and first indication information from a core network device, wherein the first indication information comprises a sequence number of a first data packet, wherein the sequence number of the first data packet indicates a first location of the first data packet in the at least one data packet of the first service, and the at least one data packet comprises the first data packet.

5. The method according to claim 4, wherein the first indication information is comprised in a packet header, a payload, or data of the first data packet; or
the first indication information is comprised in a packet header, a payload, or data of a preset data packet.

6. The method according to claim 4, wherein after the receiving at least one data packet of the first service and first indication information from a core network device, the method further comprises at least one of:
sending second indication information to a second network device, wherein the second indication information indicates process information that is of the first service and that is received by a first network device from the core network device; or
receiving third indication information sent by the second network device, wherein the third indication information indicates process information that is of the first service and that is received by the second network device from the core network device.

7. The method according to claim 6, wherein the first network device is a source network device, the second network device is a target network device, the second indication information further indicates information about the first service, and the information about the first service comprises at least one of the following:
identification information of the first service, a type of the first service, a packet data unit session identification information of the first service, a packet data unit session type of the first service, or data radio bearer identification information of the first service.

8. The method according to claim 7 wherein after the receiving the third indication information sent by the second network device, the method further comprises:
determining a third data packet based on the third indication information; and
sending the third data packet to the second network device.

9. The method according to claim 6, wherein the first network device is a target network device, the second network device is a source network device, and after the sending second indication information to a second network device, the method further comprises:
determining a fourth data packet based on the third indication information; and
buffering the fourth data packet.

10. A communication apparatus, comprising:
one or more processors; and
one or more memories coupled to the one or more processors and storing programming instructions;
for execution by the one or more processors, to cause the communications apparatus to:
receive at least one data packet of a first service, wherein the at least one data packet comprises a first data packet, and the first data packet is located at a first location in the at least one data packet; and
send the at least one data packet and first indication information to a first network device, wherein the first indication information comprises a sequence number of the first data packet, wherein the sequence number of the first data packet indicates the first location of the first data packet in the at least one data packet of the first service.

11. The communication apparatus according to claim 10, wherein the first indication information is comprised in a packet header, a payload, or data of the first data packet; or
the first indication information is comprised in a packet header, a payload, or data of a preset data packet.

12. A communication apparatus, comprising:
one or more processors; and
one or more memories coupled to the one or more processors and storing programming instructions for execution by the one or more processors, to cause the communications apparatus to:
receive at least one data packet of a first service and first indication information from a core network device, wherein the first indication information comprises a sequence number of the first data packet, wherein the sequence number of the first data packet indicates a first location of the first data packet in the at least one data packet of the first service, and the at least one data packet comprises the first data packet.

13. The communication apparatus according to claim 12, wherein the first indication information is comprised in a packet header, a payload, or data of the first data packet; or
the first indication information is comprised in a packet header, a payload, or data of a preset data packet.

14. The communication apparatus according to claim 12, wherein the programming instructions cause the communications apparatus to perform at least one of the following:
after receiving the at least one data packet and the first indication information from the core network device, send second indication information to a second network device, wherein the second indication information indicates process information that is of the first service and that is received by a first network device from the core network device; or
after receiving the at least one data packet and the first indication information from the core network device, receive third indication information sent by the second network device, wherein the third indication information indicates process information that is of the first service and that is received by the second network device from the core network device.

15. The communication apparatus according to claim 14, wherein the first network device is a source network device, the second network device is a target network device, the second indication information further indicates information about the first service, and the information about the first service comprises at least one of the following:
identification information of the first service, a type of the first service, a packet data unit session identification information of the first service, a packet data unit session type of the first service, or data radio bearer identification information of the first service.

16. The communication apparatus according to claim 15, wherein the programming instructions cause the communications apparatus to:
after receiving the third indication information sent by the second network device, determine a third data packet based on the third indication information, and send the third data packet to the second network device.

17. The communication apparatus according to claim 14, wherein the first network device is a target network device, the second network device is a source network device, and the programming instructions cause the communications apparatus to:
after sending the second indication information to the second network device, determine a fourth data packet based on the third indication information, and buffer the fourth data packet.

\* \* \* \* \*

UNITED STATES PATENT AND TRADEMARK OFFICE
CERTIFICATE OF CORRECTION

PATENT NO. : 12,278,759 B2
APPLICATION NO. : 17/837602
DATED : April 15, 2025
INVENTOR(S) : Bin Xu et al.

It is certified that error appears in the above-identified patent and that said Letters Patent is hereby corrected as shown below:

On the Title Page

In Column 2 (item (56) Other Publications), In Line 1, Delete "AppIn" and insert -- Appln --.

Signed and Sealed this
Twenty-second Day of July, 2025

Coke Morgan Stewart
*Acting Director of the United States Patent and Trademark Office*